(12) United States Patent
Ono et al.

(10) Patent No.: US 9,090,228 B2
(45) Date of Patent: Jul. 28, 2015

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Takashi Ono, Aichi-ken (JP); Yasunori Hata, Aichi-ken (JP); Akira Sumiyashiki, Aichi-ken (JP)

(73) Assignee: KABUSHIKI KAISHA TOKAI RIKA DENKI SEISAKUSHO, Aichi-Ken (JP)

( * ) Notice: Subject to any disclaimer, the term of this patent is extended or adjusted under 35 U.S.C. 154(b) by 182 days.

(21) Appl. No.: 13/716,598

(22) Filed: Dec. 17, 2012

(65) Prior Publication Data

US 2013/0161437 A1 Jun. 27, 2013

(30) Foreign Application Priority Data

Dec. 27, 2011 (JP) ................................. 2011-286890

(51) Int. Cl.
*B60R 22/40* (2006.01)
*B60R 22/405* (2006.01)
*B60R 22/26* (2006.01)

(52) U.S. Cl.
CPC ............... *B60R 22/40* (2013.01); *B60R 22/26* (2013.01); *B60R 22/405* (2013.01); *B60R 2022/403* (2013.01)

(58) Field of Classification Search
USPC .......... 242/384.4; 297/216.13–0.14, 474, 478
See application file for complete search history.

(56) References Cited

U.S. PATENT DOCUMENTS

| 5,716,102 | A | * | 2/1998 | Ray et al. ........................ 297/478 |
| 6,015,164 | A | * | 1/2000 | Yano ............................. 280/806 |
| 6,068,340 | A | | 5/2000 | Yano et al. |
| 6,254,191 | B1 | * | 7/2001 | Yamamoto et al. ........... 297/478 |
| 6,340,209 | B1 | | 1/2002 | Yamamoto et al. |
| 2013/0200195 | A1 | * | 8/2013 | ONO et al. .................... 242/382 |

FOREIGN PATENT DOCUMENTS

| EP | 0832796 A2 | 4/1998 |
| EP | 0858934 A1 | 8/1998 |
| JP | 2000-52921 A | 2/2000 |
| WO | 2013073568 | 11/2012 |

OTHER PUBLICATIONS

Extended European Search Report dated Mar. 22, 2013 issued in corresponding EP application No. 12198358.9.
Japanese Office Action dated Apr. 7, 2015 and English translation of Notice of Reasons for Rejection.

* cited by examiner

*Primary Examiner* — Sang Kim
(74) *Attorney, Agent, or Firm* — Roberts Mlotkowski Safran & Cole P.C.

(57) ABSTRACT

In a reclining sensor of a webbing take-up device, when a case turns together with a seat back that tilts towards the seat rear, rotation of a pulley is restricted by a pressing tab of an operation plate. Accordingly, when relative rotation of the pulley occurs with respect to the case, a wire is pulled out from another end of a tube, turning a sensor housing of an acceleration sensor. The wire pulled out from the other end of the tube is wound up onto a winding portion that is an outer peripheral portion of the pulley that rotates. Since the pulley that pulls the wire merely rotates about its center of rotation, the inside of the case is sufficient as long as rotation range of the pulley is secured, enabling a reduction in size of the case.

13 Claims, 11 Drawing Sheets

WEBBING TAKE-UP DEVICE

CROSS-REFERENCE TO RELATED APPLICATION

This application claims priority under 35 USC 119 from Japanese Patent Application No. 2011-286890 filed Dec. 27, 2011, the disclosure of which is incorporated by reference herein.

BACKGROUND OF THE INVENTION

1. Field of the Invention

The present invention relates to a webbing take-up device configuring a vehicle seat belt device.

2. Description of the Related Art

Japanese Patent Application Laid-Open (JP-A) No. 2000-52921 (Patent Document 1) discloses a webbing take-up (referred to as a seat belt retractor in Patent Document 1) device provided inside a seat back of a vehicle seat that has what is referred to as a reclining mechanism. The webbing take-up device is provided with an acceleration sensor for actuating a locking mechanism when the vehicle decelerates suddenly, and a sensor case thereof is capable of turning with respect to a frame of the webbing take-up device for example.

A one end of a cable is anchored to the sensor case through a wheel, and the sensor case turns due to the cable moving in the cable length direction. The other end of the cable is anchored to a rack, and the rack slides when a pinion is rotated as integrally with the seat back by the seat back tilting. The cable is thereby moved in the cable length direction towards the one end side or the other end side. Accordingly, the sensor case is maintained substantially horizontally according to the seat back angle of tilt.

In the configuration disclosed in Patent Document 1, due to the rack sliding in a straight line, a case for housing the rack becomes bulky since consideration needs to be given to the movable (slide) range of the rack.

SUMMARY OF THE INVENTION

In consideration of the above circumstances, the present invention is provided to obtain a webbing take-up device that can achieve a reduction in size for a mechanism that couples to tilting of the seat back and a reduction in size of a member that houses such a mechanism.

A webbing take-up device of a first aspect of the present invention includes: a take-up device main body that is provided at a seat back that is capable of tilting, with respect to a seat cushion configuring a vehicle seat, about an axis having an axial direction in a seat width direction, the take-up device main body including: a spool that takes up a webbing by rotating in a take-up direction; and a locking mechanism that, by actuating, restricts rotation of the spool in a pull-out direction that is an opposite direction to the take-up direction; an acceleration sensor that includes a housing on which is placed an inertia mass body that actuates the locking mechanism by moving under inertia, the acceleration sensor being provided at the take-up device main body so as to be capable of turning with respect to the take-up device main body about a specific turning axis; an elongated coupling member whose leading end in a length direction is directly or indirectly connected to the housing of the acceleration sensor, and that turns the housing of the acceleration sensor with respect to the take-up device main body by displacing in the length direction; a tilt detection section that includes a rotating body to which a base end side in the length direction of the coupling member is anchored and which rotates integrally with tilting of the seat back or rotates in conjunction with the tilting of the seat back, the rotating body winding up thereon the coupling member from the base end side in the length direction of the coupling member by rotating in one direction to pull and move the coupling member towards the base end side in the length direction of the coupling member; and a coupling member adjusting section to which a base end in the length direction of the coupling member is anchored and that is provided at the rotating body so as to be capable of moving in a line tangential to rotation of the rotating body.

According to the webbing take-up device of the first aspect of the present invention, when the seat back tilts with respect to the seat cushion about the axis with the axial direction being as the seat width direction, the rotating body of the tilt detection section rotates as one with the seat back or rotates in conjunction with (interlockingly to) the tilting of the seat back. The length direction base end of the coupling member is anchored to the rotating body. When the seat back tilts towards one tilt direction (for example the direction in which the seat back is tilted towards the seat rear side) and the rotating body rotates in the one rotation direction, the coupling member is wound up onto the rotating body from the length direction base end side of the coupling member. The coupling member is thereby pulled towards the length direction base end side due to the coupling member being wound up onto the rotating body, and the length direction leading end of the coupling member moves towards the base end side.

The length direction leading end of the coupling member is connected, either directly or indirectly through a transmission section such as a gear or a pulley, to the housing of the acceleration sensor provided so as to be capable of turning with respect to the take-up device main body. The housing of the acceleration sensor turns with respect to the take-up device body due to the length direction leading end of the coupling member moving towards the base end side. The take-up device main body is provided at the seat back and tilts together with the seat back, however tilting of the housing of the acceleration sensor is suppressed due to the housing of the acceleration sensor being turned with respect to the take-up device main body by the coupling member when the seat back is tilted. The acceleration sensor can accordingly be actuated similarly to in a non-tilted state of the seat back even when the seat back is tilted.

In the webbing take-up device of the present invention, pulling of the coupling member (moving of the coupling member towards the length direction base end side) is caused by the rotating body of the tilt detection section winding up thereon the coupling member from the length direction base end side. The rotating body merely rotates around its center of rotation and does not slide in a direction orthogonal to the axis of the center of rotation (rotation radial direction). Namely, the rotating body can perform such operation within its own placement space. A reduction in size can accordingly be achieved for the tilt detection section.

According to the webbing take-up device of the present invention, the coupling member adjusting section is provided to the rotating body so as to be capable of moving in the tangential line direction of rotation of the rotating body, with the base end of the coupling member anchored to the coupling member adjusting section. When the coupling member adjusting section is moved in one tangential line direction, the coupling member is pulled and moves towards the length direction base end side. On the other hand, when the coupling member adjusting section is moved in the other tangential line direction, the coupling member is pushed back and moves towards the length direction leading end side. Initial adjustment can accordingly be made to the rotation position of the rotating body with respect to the seat back and to the turn position of the housing of the acceleration sensor with respect to the take-up device main body.

A webbing take-up device of a second aspect of the present invention is the first aspect of the present invention further including: a tube whose leading end side is anchored to the take-up device main body and through the inside of which the coupling member passes; and a rotating body support member that rotatably supports the rotating body and to which a base end of the tube is anchored, wherein an operation section is provided at the rotating body support member at a side opposite to a side of an anchored position of the base end of the tube with respect to a center of rotation of the rotating body such that operation of the coupling member adjusting section is possible in a state in which the rotating body is positioned in a rotation position corresponding to the operation section.

According to the webbing take-up device of the second aspect of the present invention, the leading end side of the tube to the inside of which the coupling member passes is anchored to the take-up device main body and the base end of the tube is anchored to the rotating body support member. The rotating body support member rotatably supports the rotating body and is provided with the operation section on the opposite side to the anchored position of the tube to the rotating body support member with respect to the center of rotation of the rotating body. Operation of the coupling member adjusting section through the operation section is possible in a state in which the rotating body is positioned in the rotation position corresponding to the operation section, so the coupling member adjusting section can be moved in the tangential line direction of the rotating body.

A webbing take-up device of a third aspect of the present invention is the second aspect of the present invention wherein: the rotating body support member includes a support member main body; the support member main body is formed in a shape having a bottom and opening toward one side in a rotation axial direction of the rotating body, and rotatably supports the rotating body thereinside; a tube anchor portion is formed at the support member main body, the tube anchor portion opening at a portion of an outer periphery thereof along a length direction of the tube, and anchoring the base end of the tube disposed inside the tube anchor portion; and a tube mounting opening is formed at the tube anchor portion, the tube mounting opening opening in a direction orthogonal to the length direction of the tube and opening toward an outer side in a rotation radial direction of the rotating body.

According to the webbing take-up device according to the third aspect of the present invention, the rotating body support member is configured to include the support member main body. The support member main body is formed in a bottomed shape that is open toward the one side in the rotation axial direction of the rotating body and the rotating body is rotatably supported inside the support member main body.

The tube anchor portion that anchors the base end of the tube is formed to the support member main body. The tube anchor portion is open in the tube length direction. The base end side of the tube disposed inside the tube anchor portion extends from the opening in the tube anchor portion toward the outside of the tube anchor portion. The tube mounting opening is formed at the tube anchor portion separately to the opening that is open in the tube length direction. The tube mounting opening is open in a direction that is orthogonal to the tube length direction, and is open toward the rotation radial direction outside of the rotating body. The tube is disposed inside the tube anchor portion through the tube mounting opening when the tube is mounted to the support member body.

In order for the base end side of the tube to come away from the tube anchor portion, it is therefore necessary for the tube to move toward the opening side of the tube mounting opening. When in this state the base end of the coupling member is connected to the coupling member adjusting section provided at the rotating body, since the tube does not readily move toward the opening side of the tube mounting opening, the tube also does not readily come away from the rotating body support member when the rotating body support member is preliminarily assembled to the seat back for example.

A webbing take-up device of a fourth aspect of the present invention is either the second aspect or the third aspect of the present invention wherein: a restriction portion is provided at the rotating body support member; the restriction portion faces the rotating body along a rotation direction of the rotating body, and restricts rotation of the rotating body by abutting the rotating body; and a fixing member for fixing of the rotating body support member passes through the restriction portion at a side opposite to a side of the rotating body with respect to an abutted position of the rotating body and the restriction portion.

According to the webbing take-up device of the fourth aspect of the present invention, the rotating body support member is provided with the restriction portion that faces the rotating body along the rotation direction of the rotating body. When the rotating body rotates in one rotation direction or the other and abuts the restriction portion, further rotation of the rotating body in that rotation direction is restricted by the restriction portion.

The fixing member passes through the restriction portion at the opposite side of the rotating body with respect to the abutted position of the restriction portion to the rotating body. For example, the fixing member is fixed to a specific location of the seat, attaching the rotating body support member to the seat, or another member is fixed to the rotating body support member by the fixing member. The rigidity of the restriction portion is increased due to such fixing member passing through the restriction portion at the opposite side of the rotating body with respect to the abutted position of the restriction portion to the rotating body.

A webbing take-up device of a fifth aspect of the present invention is any one of the first aspect to the fourth aspect of the present invention, wherein: the rotation transmission member is provided such that, in an engaged state with the rotating body in a rotation peripheral direction of the rotating body, the rotation transmission member is capable of coaxial relative rotation with respect to the rotating body; the rotation transmission member rotates integrally with tilting of the seat back or in conjunction with tilting of the seat back to transmit rotation to the rotating body to cause the rotating body to rotate; and the rotation transmission member is capable of relative rotation in the other direction with respect to the rotating body in a state in which rotation of the rotating body in the other direction is restricted.

The webbing take-up device according to the fifth aspect of the present invention is provided with the rotation transmission member capable of coaxial relative rotation with respect to the rotating body. The rotation transmission member is engaged with the rotating body in the rotation peripheral direction of the rotating body, and rotates integrally with tilting of the seat back or rotates in conjunction with (interlockingly to) tilting of the seat back. When the rotation transmission member rotates due to tilting of the seat back, the rotation of the rotation transmission member is transmitted to the rotating body, causing the rotating body to rotate and the coupling member to be operated.

When rotation of the rotating body in the other rotation direction (for example, a returning direction of the seat back that has been tilted towards the rear) is restricted, the rotation transmission member is able to rotate further in the other rotation direction in this state. Accordingly even when the seat back is tilted further in a tilting direction corresponding to an orientation in the other rotation direction, the rotating body does not rotate towards the other rotation direction, and so the housing of the acceleration sensor is not turned.

It is possible in any one of the first aspect to the fifth aspect of the invention that an accommodating section that accommodates the coupling member adjusting section is formed at an outer peripheral portion of the rotating body such that a length direction of an accommodation portion of the accommodating section corresponds to the line tangential to rotation of the rotating body.

Further, it is possible that a restriction portion that is provided at a support member main body rotatably supporting the rotating body thereinside faces the accommodating section of the rotating body along the rotation direction of the rotating body, and restricts rotation of the rotating body by abutting the accommodating section.

It is possible in any one of the second aspect to the fifth aspect of the invention that a peripheral wall is formed at the rotating body support member so as to rotatably support the rotating body thereinside, and the operation section is a window portion formed at the peripheral wall such that an operation member is insertable inside the rotating body support member through the window portion.

As described above, the webbing take-up device of the present invention can achieve a reduction in size of a mechanism that interlocks to tilting of the seat back and a reduction in size of a member that houses such a mechanism.

BRIEF DESCRIPTION OF THE DRAWINGS

Embodiments of the invention will be described in detail with reference to the following figures, wherein.

DETAILED DESCRIPTION OF THE INVENTION

Configuration of the Present Exemplary Embodiment

Figure 11:
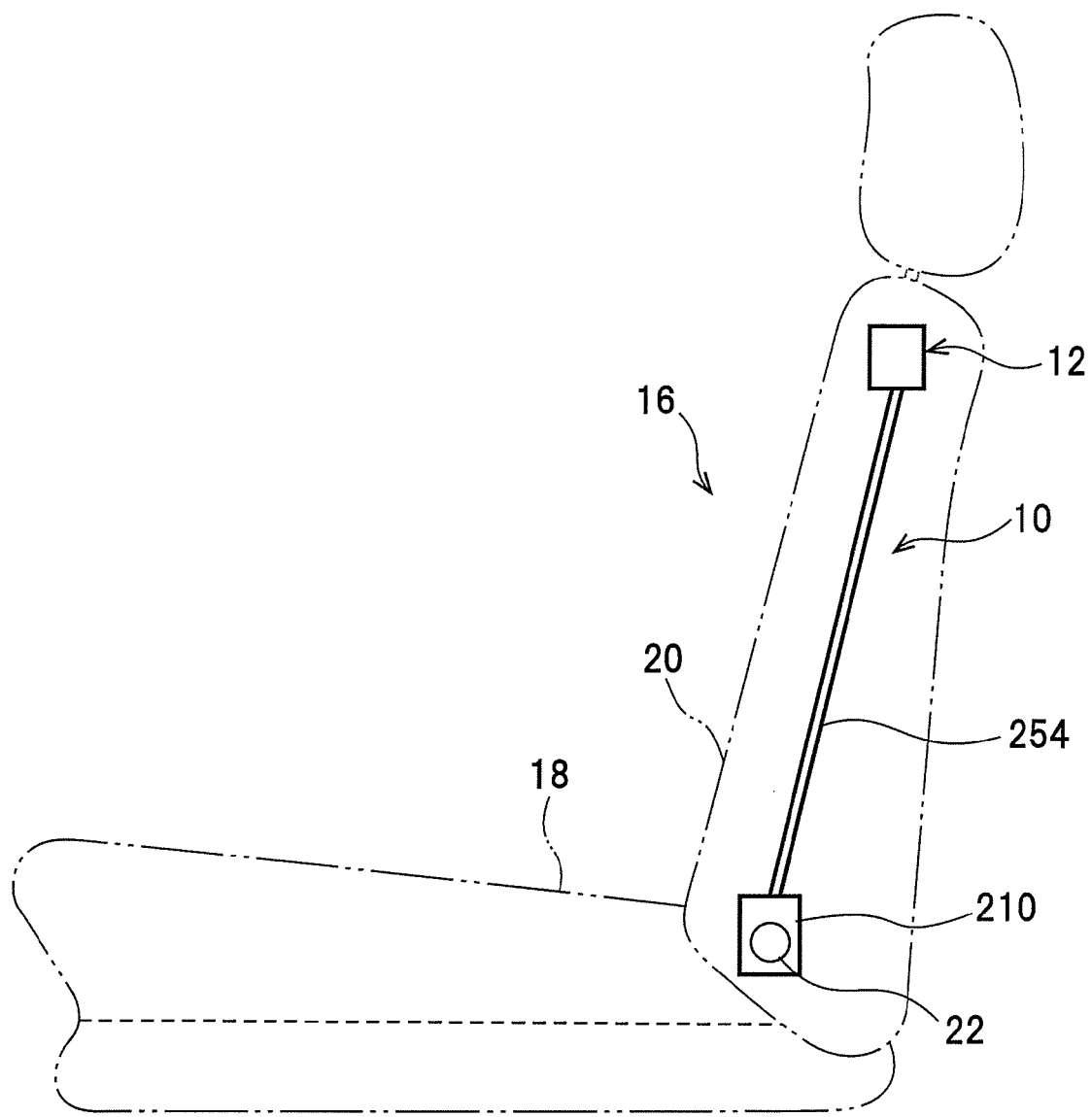
FIG. 11 is a side-on view schematically illustrating a seat applied with a webbing take-up device according to an exemplary embodiment of the present invention.

FIG. 11 is a side view illustrating a seat 16 serving as a vehicle seat installed with a webbing take-up device 10 according to an exemplary embodiment of the present invention. As shown in FIG. 11, a seat back 20 configuring a backrest of the seat 16 is provided at the rear of a seat cushion 18 configuring the seat 16. A shaft 22 whose axial direction is along in the seat 16 width direction is provided at a lower end side of the seat back 20, and the seat 16 (seat back 20) is tiltable about the shaft 22 such that an upper end side can recline towards the back and front. A take-up device main body 12 configuring the webbing take-up device 10 is provided at the inside of the seat 16 at a width direction one end side (vehicle width direction outside) of the upper end side of the seat 16.

Outline of the Overall Configuration of the Take-up Device Body 12

Figure 7:
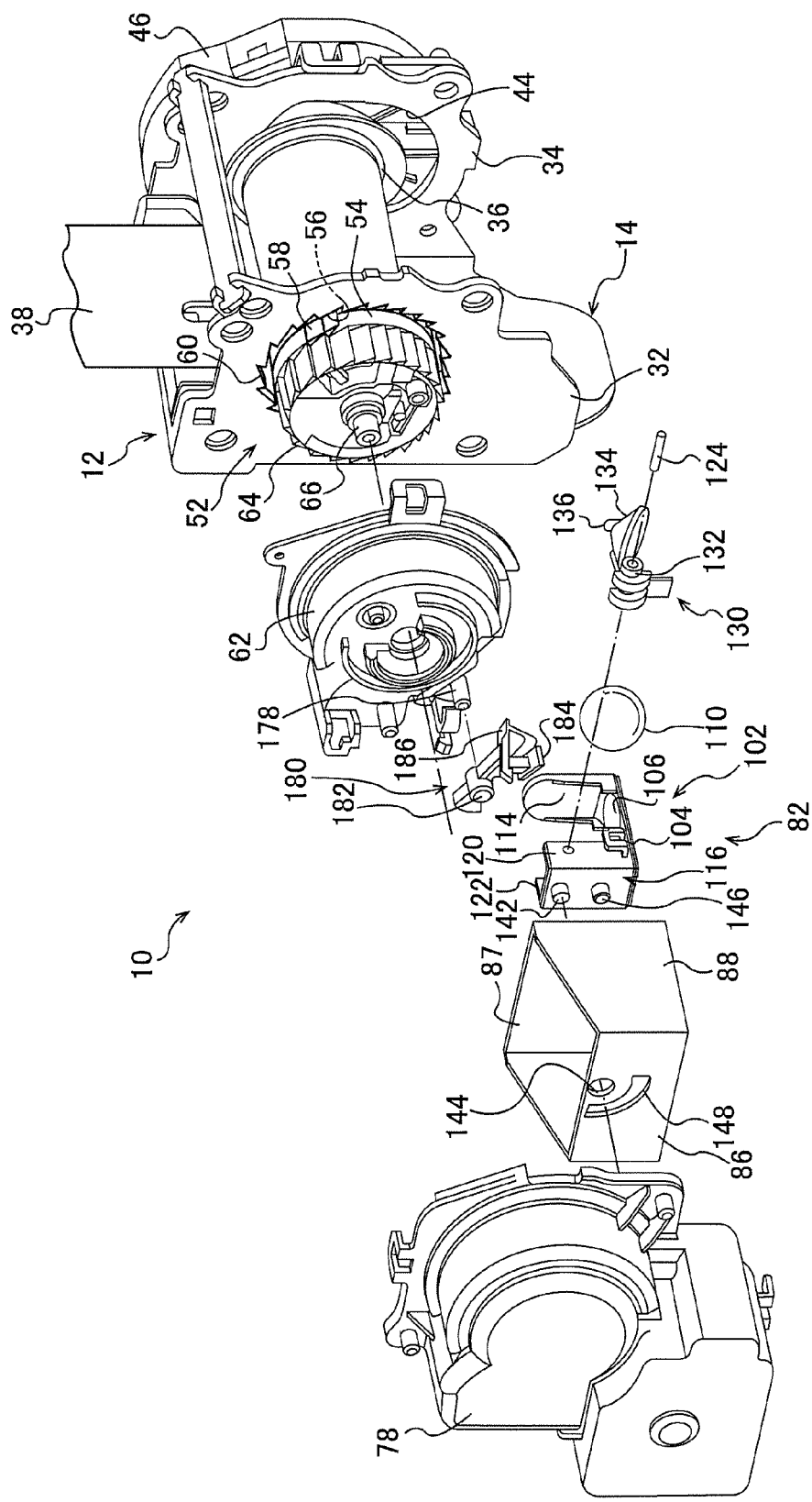
FIG. 7 is an exploded perspective view schematically illustrating a configuration of a take-up device body of a webbing take-up device according to an exemplary embodiment of the present invention.

FIG. 7 is a schematic exploded perspective view of the configuration of the take-up device body 12. As shown in FIG. 7, the take-up device body 12 is equipped with a frame 14. The frame 14 is fastened and integrally fixed to for example a frame (seat back skeleton) of the above seat back 20 by a bolt, for example.

The frame 14 is provided with a pair of leg plates 32 and 34. The leg plates 32 and 34 are respectively formed in plate shapes with the thickness direction being along the seat back width direction, so as to face each other in the seat back width direction. A spool 36 is provided between the leg plates 32 and 34. The spool 36 is configured as a hollow shaft member with the axial direction being along the facing direction of the leg plate 32 and the leg plate 34.

A length direction base end of webbing 38 is anchored (caught) to the spool 36. The webbing 38 is formed in an elongated belt shape with the width direction being along the axial direction of the spool 36. The webbing 38 is taken up and stored at an outer peripheral portion of the spool 36 from the length direction base end side when the spool 36 rotates about its axial center in a take-up direction that is a one direction. When the webbing 38 is pulled towards a webbing 38 leading end side, the webbing 38 that has been taken up on the spool 36 is pulled out, and the spool 36 rotates in a pull-out direction that is the opposite direction to the take-up direction.

The inside of the spool 36 is for example provided with a rod-shaped energy absorption section referred to for example as a torsion shaft. The energy absorption section is connected to the spool 36 at the leg plate 34 side of the spool 36, in a state in which relative movement of the energy absorption section with respect to the spool 36 is restricted. The leg plate 34 side of the energy absorption section also passes through a through hole 44 formed in the leg plate 34 and projects to the outside (the opposite side of the leg plate 34 with respect to the leg plate 32) of the leg plate 34.

A spring case 46 is attached to the leg plate 34 at the outside of the leg plate 34 (the opposite side of the leg plate 34 with respect to the leg plate 32). A spiral spring serving as a spool biasing member is housed inside the spring case 46. The spiral direction outside end of the spiral spring is anchored to the spring case 46, and the spiral direction inside end is directly or indirectly anchored to the energy absorption section. The spiral spring is wound tighter when the spool 36 and the energy absorption section rotate together in the pull-out direction, and the spool 36 is biased in the take-up direction through the energy absorption section.

A lock base 54 configuring a locking mechanism 52 is provided to the leg plate 32 side of the spool 36. The lock base 54 is mounted to a leg plate 32 side end portion of the spool 36 so as to be capable of coaxial relative rotation with respect to the spool 36. The lock base 54 is however connected to the leg plate 32 side portion of the above energy absorption section in a state in which relative rotation with respect to the energy absorption section is restricted. The lock base 54 is accordingly connected through the energy absorption section to the spool 36 in a state in which relative rotation is restricted.

A pawl housing portion 56 open at an outer peripheral face is formed to the lock base 54. A locking pawl 58 is provided inside the pawl housing portion 56. The lock base 54 passes through a ratchet hole 60 formed in the leg plate 32, and ratchet teeth formed at a leading end side of the locking pawl 58 mesh with ratchet teeth of the ratchet hole 60 when a portion of the locking pawl 58 pokes out from the pawl housing portion 56. Rotation of the lock base 54 in the pull-out direction is restricted in this state, and indirectly, rotation of the spool 36 in the pull-out direction is also restricted.

A sensor holder 62 is attached to the leg plate 32 at the leg plate 32 outside (the opposite side of the leg plate 32 with respect to the leg plate 34). A portion of the sensor holder 62 is formed to have a bottom portion, and is open towards the leg plate 32 side, and a V-gear 64 is provided at the inside thereof. A shaft portion 66 extends from the energy absorption section towards the sensor holder 62 side so as to correspond to the V-gear 64. The shaft portion 66 is provided coaxially with the spool 36, and the V-gear 64 is rotatably supported by the shaft portion 66.

The V-gear 64 is provided with a spring, not shown in the drawings. A portion of the spring engages with the lock base 54. The spring is pressed by the lock base 54 when the lock base 54 rotates in the pull-out direction, and further the spring presses the V-gear 64 in the pull-out direction. The V-gear 64 is accordingly capable of rotation in the pull-out direction so as to follow the lock base 54. The lock base 54 is capable of relative rotation in the pull-out direction with respect to the V-gear 64 by resiliently deforming the spring. A portion of the above locking pawl 58 is also engaged with the V-gear 64. With interlocking to the relative rotation in the pull-out direction of the lock base 54 with respect to the V-gear 64, the locking pawl 58 moves in the direction in which it pokes out of the pawl housing portion 56, so as to mesh with the ratchet teeth of the ratchet hole 60.

A sensor cover 78 is provided at the opposite side of the sensor holder 62 with respect to the leg plate 32. The sensor cover 78 is configured to have a bottom portion, and is open towards the leg plate 32 side, and is attached to the leg plate 32. An acceleration sensor 82 is provided inside the sensor cover 78. The acceleration sensor 82 is provided with a hanger 84. The hanger 84 is provided with support walls 86 and 87. The support wall 86 and the support wall 87 are formed with plate shapes and face each other along the same direction as the axial direction of the spool 36, or a direction inclined to the seat upper-lower direction with respect to the axial direction of the spool 36 about an axis with axial direction in the seat front-rear direction.

Peripheral walls 88 are formed between the support walls 86 and 87. The peripheral walls 88 are formed along portions of the outer peripheries of the support walls 86 and 87. The hanger 84 is accordingly configured as a hollow box shape open at portions at which the peripheral walls 88 are not formed. The hanger 84 is attached to the frame 14 by fixing the support wall 87 to the leg plate 32.

A sensor housing 102 serving as a housing and formed by for example forming overall from a synthetic resin material is provided between the support wall 86 and the support wall 87 of the hanger 84. The sensor housing 102 is provided with a placement portion 104. The placement portion 104 is formed with a concave shaped curved face 106 at a thickness direction upper side. The curved face 106 has a substantially circular shape in plan view and is open towards the upper side. A spherical body 110 serving as an inertia mass body is placed on the curved face 106.

A vertical wall 114 projects upwards from the support wall 87 side end portion of the placement portion 104. A support wall 116 is provided at the support wall 86 side of the placement portion 104. The support wall 116 is provided with a vertical wall 118. The vertical wall 118 projects upwards from a support wall 86 side end portion of the placement portion 104 and faces the vertical wall 114 along the facing direction of the support walls 86 and 87.

A lateral wall 120 extends from a width direction one end of the vertical wall 118 towards the vertical wall 114 side. A lateral wall 122 extends from the width direction other end of the vertical wall 118 towards the vertical wall 114 side. The support wall 116 accordingly configures in plan view a recessed shape open towards the vertical wall 114 side. A support shaft 124 is provided in the vicinity of an upper end portion of the support wall 116. The support shaft 124 is a shaft member with an axial direction being along the facing direction of the lateral wall 120 and the lateral wall 122. A one end of the support shaft 124 is supported by the lateral wall 120 and the other end of the support shaft 124 is supported by the lateral wall 122.

A sensor lever 130 is provided between the lateral wall 120 and the lateral wall 122. The sensor lever 130 is provided with a base portion 132, with the above support shaft 124 passing through the base portion 132. The sensor lever 130 is accordingly supported so as to be capable of swinging (turning) about the support shaft 124. The sensor lever 130 is also provided with a hat portion 134. The hat portion 134 is formed with a shallow circular cone shaped external appearance. A bottom face of the hat portion 134 is configured with a curved or sloping face with a recessed shape open towards the opposite side to an apex portion of the cone. The bottom face sits over (covers) the spherical body 110 placed on the curved face 106 of the placement portion 104.

The hat portion 134 swings about the support shaft 124 so as to rise up when the spherical body 110 runs up over the curved face 106 towards the rim portion of the curved face 106. A pressing projection 136 is formed to the hat portion 134 projecting substantially upwards (namely to the opposite side of the hat portion 134 with respect to the bottom face). The pressing projection 136 pushes a V-pawl 180, described later, upwards when the hat portion 134 swings about the support shaft 124 so as to rise up.

A turning (swing) shaft 142 is formed in the vicinity of an upper end portion of the vertical wall 118 of the support wall 116. The swing shaft 142 is formed projecting from the opposite side face of the vertical wall 118 with respect to the vertical wall 114, along the same direction as the axial direction of the spool 36. The swing shaft 142 is supported by a shaft receiving hole 144 formed in the support wall 86 of the hanger 84 so as to be capable of swinging. A guide pin 146 is formed projecting from the vertical wall 118 further to the lower side than the position on the vertical wall 118 at which the swing shaft 142 is formed. The projection direction of the guide pin 146 from the vertical wall 118 is set along the same direction as the projection direction of the swing shaft 142 from the vertical wall 118. The guide pin 146 enters a guide hole 148 formed in the support wall 86 of the hanger 84.

The guide hole 148 is configured as an elongated hole that curves with a curvature centered on the shaft receiving hole 144. The guide pin 146 enters the inside of the guide hole 148. The swing (turning) range of the sensor housing 102 about the swing shaft 142 is thereby limited to between a contact position of the guide pin 146 with a length direction one end of the guide hole 148 and a contact position of the guide pin 146 with the length direction other end of the guide hole 148.

Figure 10:
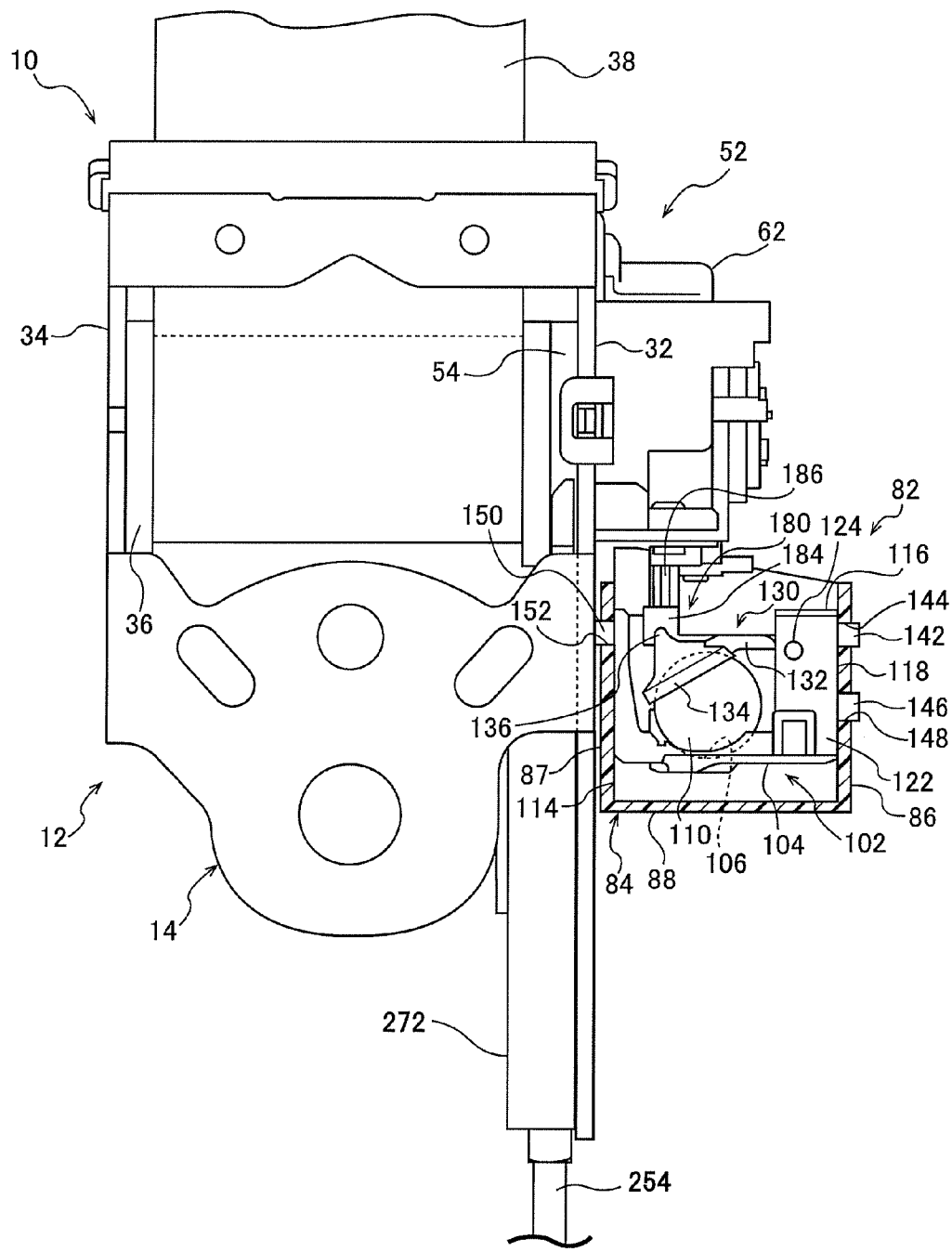
FIG. 10 is a back-face view schematically illustrating a configuration of a take-up device body of a webbing take-up device according to an exemplary embodiment of the present invention.

As shown in FIG. 10, a turning (swing) shaft 150 is also formed to the vertical wall 114. The swing shaft 150 is formed projecting coaxially to the swing shaft 142 from an opposite side face of the vertical wall 114 to the vertical wall 118. The swing shaft 150 is supported by a shaft receiving hole 152 formed in the support wall 87 of the hanger 84 so as to be capable of swinging. The forming position of the swing shaft 142 in the vertical wall 118 of the support wall 116 and the forming position of the swing shaft 150 in the vertical wall 114 are set further towards the upper side than the position of the center of gravity of the sensor housing 102 in a state in which the sensor lever 130 has been mounted to the support wall 116 and the spherical body 110 has been placed on the curved face 106 of the placement portion 104.

A support shaft 178 is formed projecting from the sensor holder 62 towards the opposite side of the sensor holder 62 to the leg plate 32. The support shaft 178 is set with an axial direction along the same direction as the axial direction of the spool 36. A base portion 182 of the V-pawl 180 is supported so as to be capable of swinging about the support shaft 178. The V-pawl 180 is provided with a plate shaped pressure receiving plate 184. The pressure receiving plate 184 is positioned to the upper side of the pressing projection 136 of the sensor lever 130. The size of the pressure receiving plate 184 is set such that the lower side face of the pressure receiving plate 184 faces the pressing projection 136 within the swing range of the sensor housing 102 about the swing shaft 142, between the state of contact of the guide pin 146 with the one end of the guide hole 148 and the state of contact of the guide pin 146 with the second end of the guide hole 148.

The V-pawl 180 is provided with an engagement claw 186. An opening, not shown in the drawings, is formed in the sensor holder 62 so as to correspond to the engagement claw 186. A portion of the sensor holder 62 housing the V-gear 64 and the outside of the sensor holder 62 are in communication through this opening. The pressing projection 136 presses the pressure receiving plate 184 upwards when the sensor lever 130 swings about the support shaft 124 so as to rise up, so the engagement claw 186 meshes with ratchet teeth formed at a peripheral outside portion of the V-gear 64. Rotation of the V-gear 64 in the pull-out direction is thus restricted when the engagement claw 186 meshes with the ratchet teeth of the V-gear 64.

Configuration of the Reclining Sensor 210

As shown in FIG. 11, the webbing take-up device 10 is provided with a reclining sensor 210 that serves as a tilt detection section and configures the webbing take-up device 10 together with the take-up device main body 12. As shown in FIG. 11, the reclining sensor 210 is provided at the inside of the seat back 20, at a lower end side at a width direction another end side (vehicle width direction central side) of the seat back 20.

Figure 1:
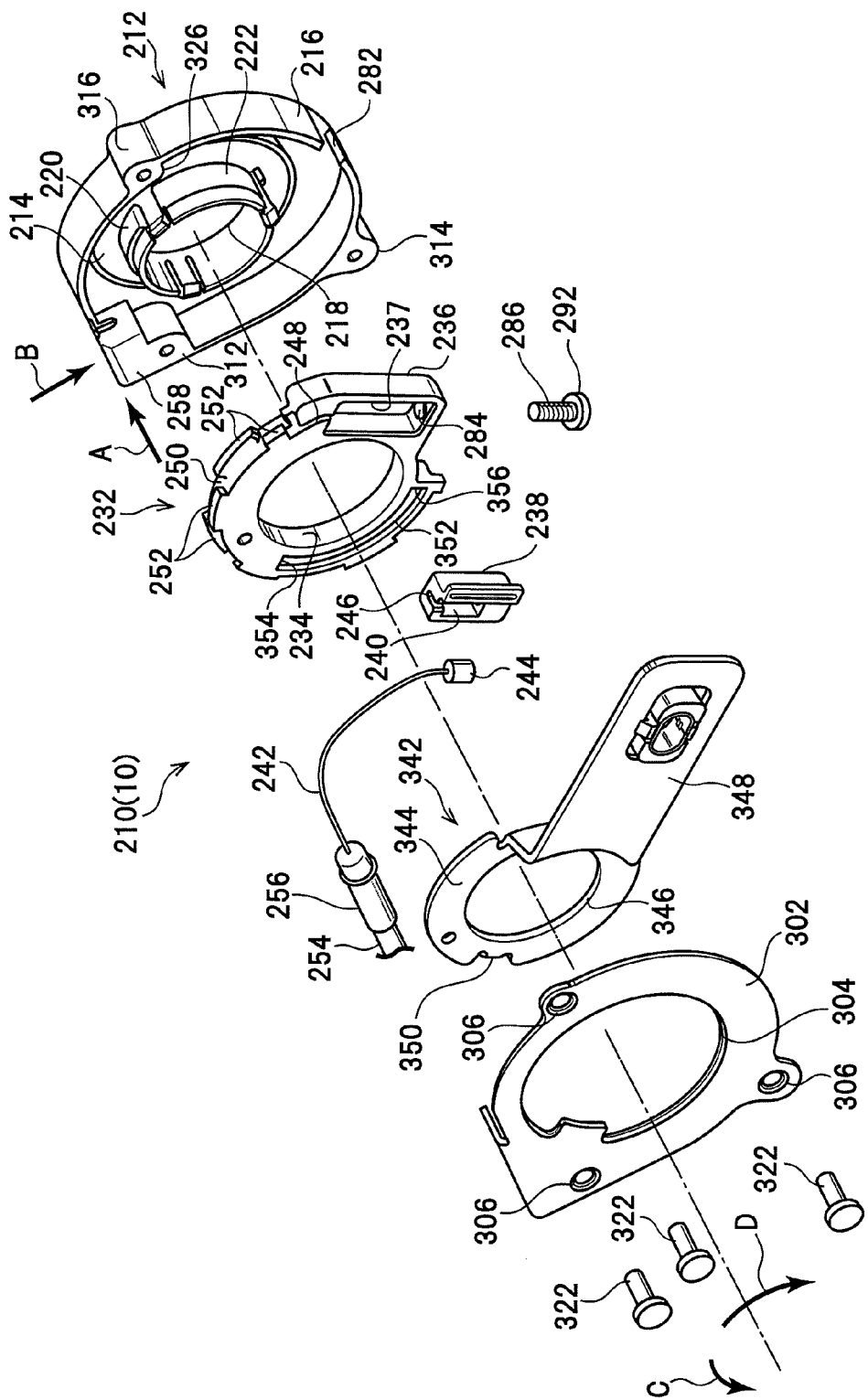
FIG. 1 is an exploded perspective view schematically illustrating a configuration of a tilt detection section of a webbing take-up device according to an exemplary embodiment of the present invention.

FIG. 1 is an exploded perspective view schematically illustrating the configuration of the reclining sensor 210. As shown in FIG. 1, the reclining sensor 210 is provided with a case 212 configuring a rotating body support member that serves as a support member main body. The case 212 is provided with plate shaped bottom wall 214 with a thickness direction being along the seat 16 width direction. A peripheral wall 216 projects from an outer peripheral portion of the bottom wall 214 towards one side in a bottom wall 214 thickness direction. The case 212 is configured overall with a bottomed box shape that is open towards the one side in the bottom wall 214 thickness direction.

A circular hole 218 through which the above mentioned shaft 22 passes is formed substantially in the center of the bottom wall 214 of the case 212. A circular cylinder shaped cylinder portion 220 is provided inside the case 212. The cylinder portion 220 is provided with a large diameter cylinder portion 222. The large diameter cylinder portion 222 is formed in a circular cylinder shape with inner diameter dimension that is substantially the same as the inner diameter dimension of the above circular hole 218. The large diameter cylinder portion 222 projects from the bottom wall 214 coaxially to the circular hole 218 in the same direction as the projection direction of the peripheral wall 216. The cylinder portion 220 is further provided with a small diameter cylinder portion 224. The small diameter cylinder portion 224 is configured with a circular cylinder shape having an inner diameter dimension substantially the same as the inner diameter dimensions of the circular hole 218 and the large diameter cylinder portion 222, and having an outer diameter dimension smaller than the outer diameter dimension of the large diameter cylinder portion 222. The small diameter cylinder portion 224 is formed coaxially to the circular hole 218 and the large diameter cylinder portion 222, and is formed continuously from a leading end (an end portion at the opposite side of the large diameter cylinder portion 222 to the bottom wall 214) of the large diameter cylinder portion 222.

A pulley 232 serving as a rotating body is provided inside the case 212. The pulley 232 is configured in a plate shape with thickness direction being along the thickness direction of the bottom wall 214 (namely, the shaft 22 axial direction). A circular hole 234 is formed in the pulley 232. The circular hole 234 is configured as a circular hole penetrating the pulley 232 with an inner diameter dimension slightly larger than the outer diameter dimension of the large diameter cylinder portion 222 of the cylinder portion 220. The pulley 232 is disposed inside the case 212 in a state in which the large diameter cylinder portion 222 passes through the circular hole 234. The pulley 232 is configured so as to be capable of rotation centered about the large diameter cylinder portion 222.

An adjuster piece housing portion 236 is formed to the pulley 232 at an outer peripheral portion of the pulley 232. The adjuster piece housing portion 236 is formed with an adjuster piece housing hole 237. The adjuster piece housing hole 237 is configured to have a bottom portion, and is open towards the projection direction of the wall 216 from the bottom wall 214. The shape of the opening of the adjuster piece housing hole 237 is configured as a rectangular shape with length direction of the adjuster piece housing hole 237 being along a tangential direction of the circular hole 234. An adjuster piece 238 serving as a coupling member adjusting section is housed inside the adjuster piece housing hole 237. The adjuster piece 238 is configured with a block shape having a width dimension slightly smaller than the internal width dimension of the adjuster piece housing hole 237. However, the dimension of the adjuster piece 238 along the length direction of the adjuster piece housing hole 237 is set shorter than the length direction dimension of the adjuster piece housing hole 237, thereby allowing the adjuster piece 238 to slide along the length direction of the adjuster piece housing hole 237 until it contacts one inner wall or the other inner wall at length direction ends of the adjuster piece housing hole 237.

The adjuster piece 238 is formed with an anchor (catch) piece housing portion 240. The anchor piece housing portion 240 is configured to a hole having a bottom portion, that is open towards the opening direction of the adjuster piece housing hole 237 in a state in which the adjuster piece 238 is housed in the adjuster piece housing hole 237. An anchor (catch) piece 244 is housed inside the anchor piece housing portion 240.

A length direction base end portion of a wire 242 serving as a coupling member is anchored (caught) to the anchor piece 244. A passing groove 246 is formed in the adjuster piece 238 corresponding to the length direction base end side of the wire 242. The wire 242 passes through the inside of the passing groove 246 in a state in which the adjuster piece 238 is housed in the adjuster piece housing hole 237. A passing groove 248 is further formed to the adjuster piece housing portion 236, and the wire 242 that has passed through the passing groove 246 then passes through the passing groove 248.

In the pulley 232, a portion of an outer peripheral portion of the pulley 232 at the side which is opposite to the position at which the adjuster piece housing hole 237 is formed with respect to the passing groove 248 configures a wind portion 250. Configuration is made such that the wire 242 that has passed through the passing grooves 246 and 248 can be wound onto the wind portion 250. Slip-off prevention tabs 252 extend towards the rotation radial direction outside of the pulley 232 at both pulley 232 rotation axial direction sides of the wind portion 250. Displacement of the wire 242 wound onto the wind portion 250 in the pulley 232 axial direction is restricted by interference with the slip-off prevention tabs 252 from both pulley 232 axial direction sides, thereby preventing the wire 242 from slipping off the wind portion 250.

The wire 242 passes through a tube 254. The tube 254 is formed with a flexible elongated cord shape, and is configured in a cylinder shape open at both ends in the center axial direction. An anchor (catch) fastening (metal piece) 256 is attached to a length direction base end portion of the tube 254. A tube anchor (catch) portion 258 is formed to the case 212 so as to correspond to the anchor fastening 256.

Figure 5:
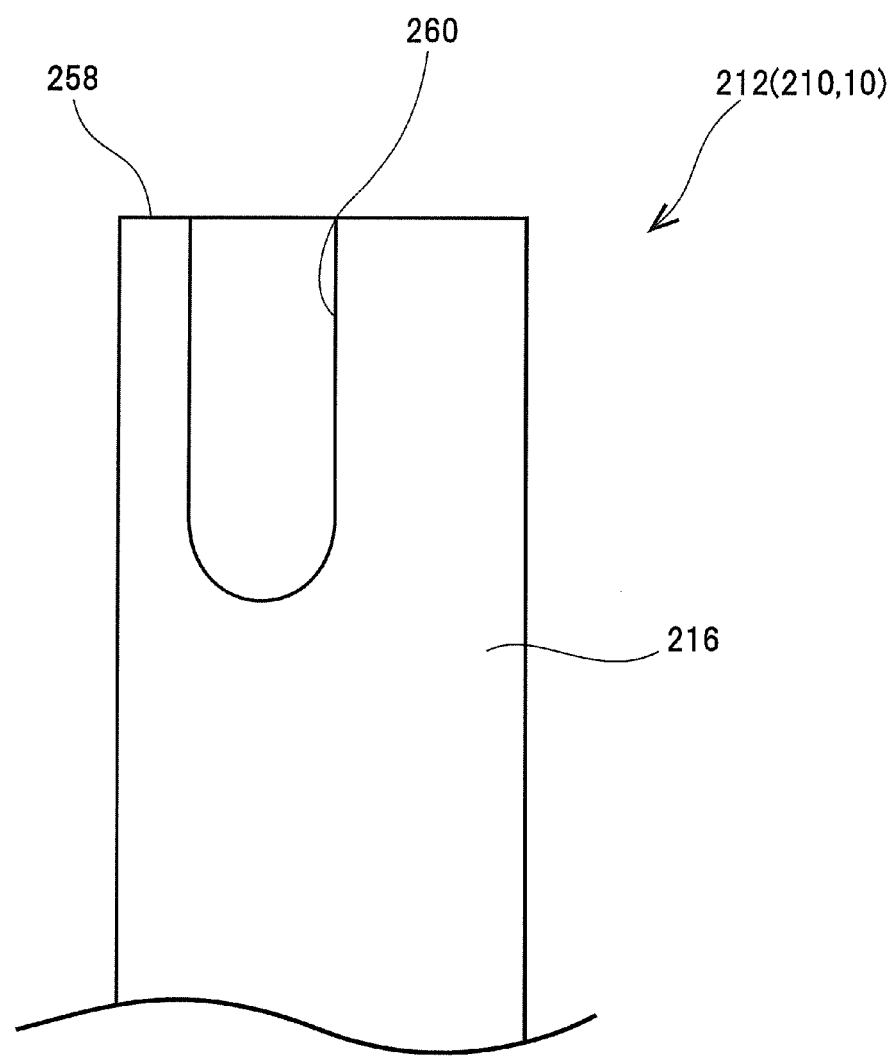
FIG. 5 is an enlarged side-on view of a portion of a rotating body support member that anchors a length direction base end portion of a tube.
Figure 6:
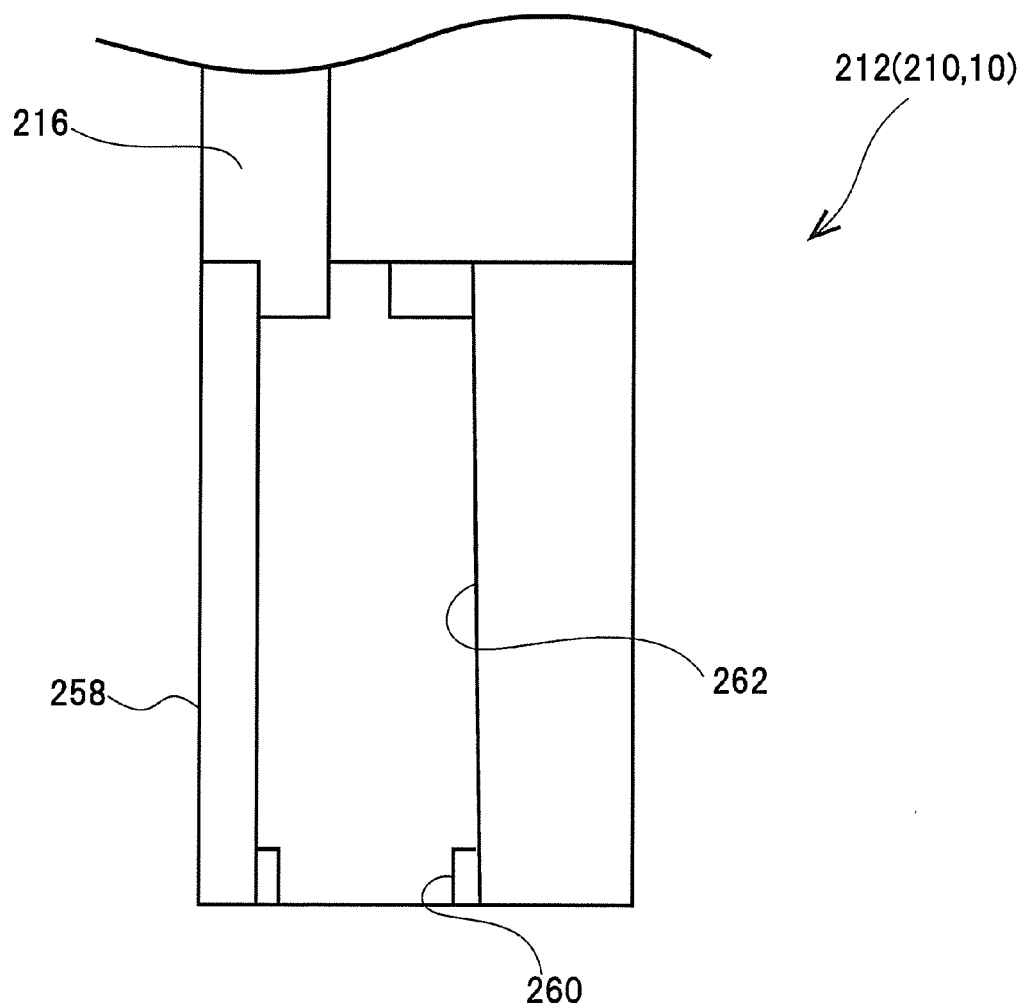
FIG. 6 is an enlarged plan view of a portion of a rotating body support member that anchors a length direction base end portion of a tube.

FIG. 5 is an enlarged diagram showing the case 212 as viewed along the arrow A direction in FIG. 1. As shown in FIG. 5, a notch portion 260 is formed to the peripheral wall 216 of the case 212 so as to correspond to the tube anchor portion 258. The notch portion 260 is formed with a narrow width slit shape, with inner width dimension being equal to the outer diameter dimension of the tube 254 or larger, but being smaller than the outer diameter dimension of the anchor fastening 256. FIG. 6 is an enlarged diagram showing the case 212 as viewed along the arrow B direction in FIG. 1. As shown in FIG. 6, an opening groove portion 262 is formed to the peripheral wall 216 of the case 212 so as to correspond to the tube anchor portion 258.

The opening groove portion 262 is configured such that an opening width dimension is equal to the outer diameter dimension of the anchor fastening 256 or larger, and is open at both sides of the opening groove portion 262 along the axial direction of the anchor fastening 256. The anchor fastening 256 can accordingly be disposed inside the tube anchor portion 258 through the opening groove portion 262. An engagement portion, not shown in the drawings, provided to the inside the tube anchor portion 258 engages with the anchor fastening 256 in a state in which the anchor fastening 256 is disposed inside the tube anchor portion 258. Displacement of the anchor fastening 256 along the length direction is thereby restricted, and displacement of a length direction base end portion of the tube 254 along the length direction is accordingly also restricted.

A length direction leading end of the thus configured tube 254 is anchored (caught) to a lower end portion of a sensor housing operation section 272, illustrated in FIG. 10, and a leading end side of the wire 242 that passes through the tube 254 enters inside the sensor housing operation section 272. A rack, not shown in the drawings, is provided inside the sensor housing operation section 272 so as to be capable of sliding in a straight line along a rotation radial direction of the sensor housing 102 with respect to the frame 14. The leading end of the wire 242 is anchored to the rack. A pinion gear provided inside the sensor housing operation section 272 meshes with the rack. The pinion gear is supported so as to be capable of rotating about an axis with axial direction oriented in the same direction as the axis of rotation of the sensor housing 102 with respect to the frame 14, and the pinion gear is connected to the sensor housing 102 either directly or indirectly through for example other gears.

When the rack slides towards the length direction base end side of the wire 242 due to the leading end side of the wire 242 moving towards the wire 242 length direction base end side, the pinion gear that is meshed with the rack rotates, and the rotation of the pinion gear is transmitted to the sensor housing 102, thereby rotating the sensor housing 102 with respect to the frame 14.

A wire biasing section, not shown in the drawings, configured by for example a compression coil spring is provided inside the sensor housing operation section 272. The wire biasing section biases the leading end side of the wire 242 towards the length direction leading end side of the wire 242 either directly or indirectly through other members such as the rack described above.

Figure 2:
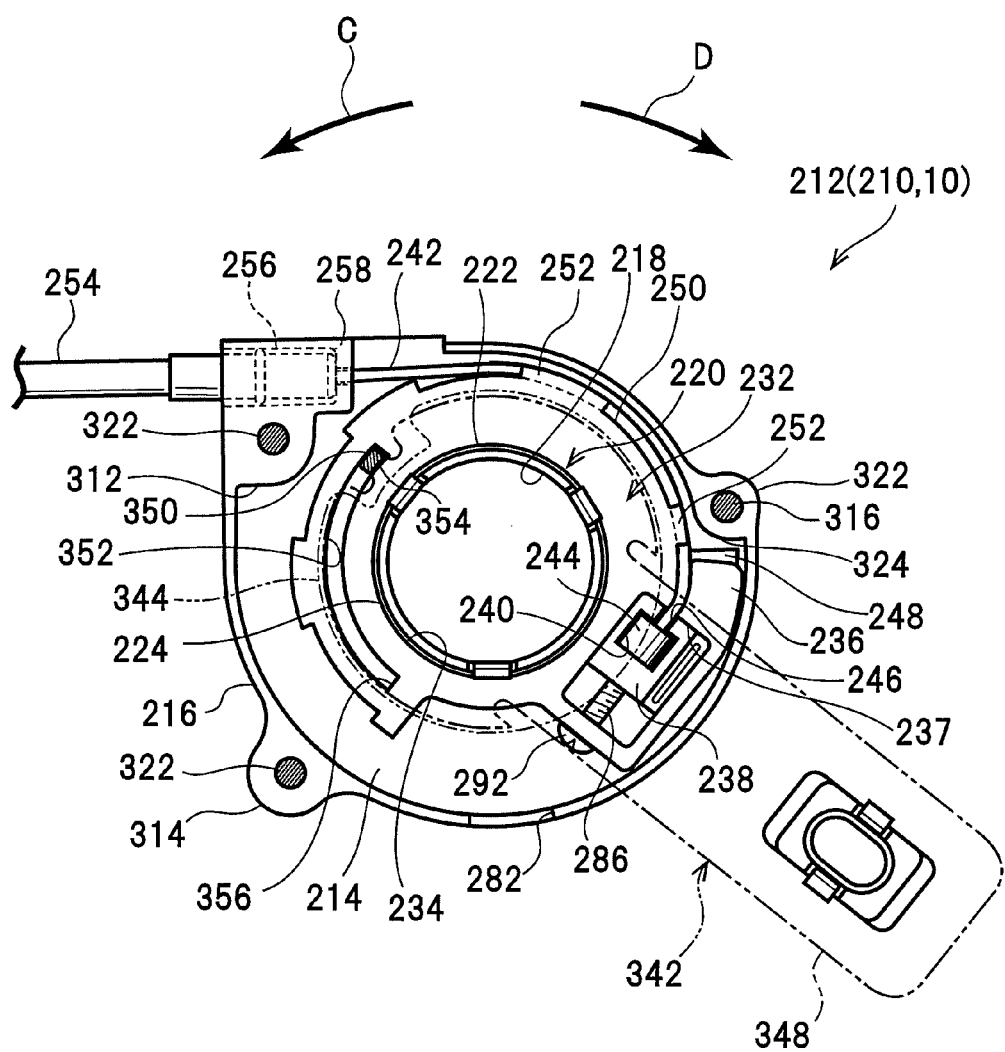
FIG. 2 is a face-on view of a tilt detection section in an initial state of the seat back.

In a state in which the seat back 20 is not reclined (not tilted towards the rear) and is not tilted towards the front of the seat 16 to be folded (this state is referred to below as the seat back initial state), the adjuster piece housing portion 236 of the pulley 232 is positioned substantially at the side which is opposite to the tube anchor portion 258 with respect to the center of rotation of the pulley 232, as shown in FIG. 2. An adjuster piece operation window 282 is formed to the peripheral wall 216 of the case 212 so as to correspond to the adjuster piece housing hole 237 which is in this state.

The adjuster piece operation window 282 is formed on an extension line which is along the length direction of the adjuster piece housing hole 237 with respect to the position of the adjuster piece housing hole 237 in the seat back initial state, such that an adjuster piece operation member, such as a screw driver, can be inserted inside the case 212 through the adjuster piece operation window 282. A through hole 284 is formed through an inside wall of the adjuster piece housing hole 237 of the adjuster piece housing portion 236 which inside wall is at the opposite side to the portion at which the passing groove 248 is formed along the length direction of the adjuster piece housing hole 237, and a male thread 286 passes through the through hole 284. A leading end side of the male thread 286 enters inside the adjuster piece housing hole 237 and is screwed into a female threaded hole formed in the adjuster piece 238.

Moreover, a head portion 292 of the male thread 286 abuts an outer peripheral portion of the adjuster piece housing portion 236 at the outside of the adjuster piece housing portion 236. By that the adjuster piece operation member such as a screwdriver that has been passed through the adjuster piece operation window 282 is engaged with the head portion 292 to rotate and operate the male thread 286 about the axial center of the male thread 286, the adjuster piece 238 is slid in the length direction of the adjuster piece housing hole 237 inside the adjuster piece housing hole 237

As shown in FIG. 1, a lid 302 is provided to the opening side of the case 212. The lid 302 is formed in a plate shape with the thickness direction being along the thickness direction of the bottom wall 214. The opening end of the case 212 is closed off by the lid 302. A through hole 304 is formed in the lid 302, and the shaft 22 that has passed through the cylinder portion 220 of the case 212 passes through the through hole 304.

Bosses 312, 314, 316 are formed to the case 212 at three locations corresponding to through holes 306. Through holes penetrating in the thickness direction of the bottom wall 214 are formed in the bosses 312 to 316. The lid 302 is fastened and integrally fixed to the case 212 by fastening members 322 such as screws or bolts that pass through the through holes in the bosses 312 to 316 and the through holes 306 in the lid 302.

Amongst the bosses 312 to 316 at three locations, a portion of the outer periphery of the boss 316 enters inside the case 212 so as to jut out to the inside of the case 212. The portion of the boss 316 that enters to the inside of the case 212 configures a restriction portion 326. The restriction portion 326 opposes the adjuster piece housing portion 236 that juts out further towards the rotation radial direction outside of the pulley 232 than the wind portion 250, along the rotation direction of the pulley 232. Further rotation of the pulley 232 is accordingly restricted when the adjuster piece housing portion 236 has contacted the restriction portion 326 due to rotation of the pulley 232.

An operation section 344 of an operation plate 342 serving as a rotation transmission member is provided between the lid 302 and the pulley 232. The operation section 344 is formed in a plate shape with a thickness direction being along the thickness direction of the bottom wall 214. A circular hole 346 is formed to the operation section 344, and the shaft 22 that has passed through the large diameter cylinder portion 222 passes through the circular hole 346.

A fixing tab 348 extends from a portion of the outer periphery of the operation section 344. A leading end side of the fixing tab 348 is integrally joined to a specific portion of the seat cushion 18 (for example a frame of the seat cushion 18). Namely, in the present exemplary embodiment, the case 212 turns with respect to the operation plate 342 when the seat back 20 tilts with respect to the seat cushion 18.

A pressing tab 350 is formed to a portion of the outer periphery of the operation section 344. The pressing tab 350 extends towards the bottom wall 214 side of the case 212. A slit hole 352 is formed in the pulley 232 corresponding to the pressing tab 350. The slit hole 352 is formed in a curved slit shape with a center of curvature at the center of rotation of the pulley 232. A leading end side of the pressing tab 350 enters inside the slit hole 352.

As described above, the wire 242 is constantly biased towards the wire 242 length direction leading end side by biasing force of the wire biasing section provided to the sensor housing operation section 272. The pulley 232 is accordingly constantly biased in the FIG. 1 arrow C direction, and arrow D side length direction end portion 354 of the slit hole 352 is in press contact with the pressing tab 350. When the case 212 which is integrated to the seat back 20 rotates in the arrow C direction and the pulley 232 attempts to rotate in the arrow C direction together with the case 212, the pressing tab 350 formed to the operation plate 342 which is integrated to the seat cushion 18 accordingly abuts the end portion 354 of the slit hole 352, restricting rotation of the pulley 232 in the arrow C direction. The length direction base end of the wire 242 is accordingly pulled and moved by the pulley 232 when the case 212 relatively rotates in the arrow C direction with respect to the pulley 232.

As above, when the case 212 rotates in the FIG. 1 arrow D direction with the pulley 232 in a state in which the adjuster piece housing portion 236 has abutted the restriction portion 326, the pressing tab 350 of the operation plate 342 relatively moves within the slit hole 352 so as to move away from the end portion 354 and approach an end portion 356 of the slit hole 352 at the opposite side to the end portion 354.

Operation and Effects of the Present Exemplary Embodiment

Explanation follows regarding operation and effects of the present exemplary embodiment.

In the webbing take-up device 10, when there is a sudden vehicle deceleration, the spherical body 110 on the curved face 106 formed at the placement portion 104 of the sensor housing 102 of the acceleration sensor 82 rises up to move towards a rim portion side of the curved face 106. The thus moving spherical body 110 pushes the bottom face of the hat portion 134 upwards, thereby swinging the sensor lever 130 upwards about the support shaft 124.

When the sensor lever 130 swings in this way, the pressing projection 136 formed to the hat portion 134 pushes the lower face of the pressure receiving plate 184 of the V-pawl 180 upwards, swinging the V-pawl 180 about the support shaft 178. The engagement claw 186 of the thus swung V-pawl 180 rises and meshes with the ratchet teeth formed to the outer peripheral portion of the V-gear 64. Rotation of the V-gear 64 in the pull-out direction is accordingly restricted.

The webbing 38 is pulled when an occupant wearing the webbing 38 moves towards the vehicle front under inertia due to sudden vehicle deceleration. The spool 36 rotates in the pull-out direction when the webbing 38 is pulled. The lock base 54 is connected to the spool 36 through the energy absorption section described above. Relative rotation of the lock base 54 with respect to the spool 36 is restricted, and so the lock base 54 rotates in the pull-out direction due to the spool 36 rotating in the pull-out direction.

Relative rotation of the lock base 54 with respect to the V-gear 64 in the pull-out direction occurs when the lock base 54 rotates together with the spool 36 in the pull-out direction in a state in which relative rotation of the V-gear 64 in the pull-out direction is restricted due to the engagement claw 186 of the V-pawl 180 meshing with the ratchet teeth of the V-gear 64 as described above. When such relative rotation between the V-gear 64 and the lock base 54 occurs, the pawl housing portion 56 moves such that a portion of the locking pawl 58 projects from the pawl housing portion 56 formed to the lock base 54. The ratchet teeth at the leading end side of the locking pawl 58 thereby meshes with the ratchet teeth of the ratchet hole 60 formed in the leg plate 32.

Rotation of the lock base 54 in the pull-out direction and rotation of the spool 36 in the pull-out direction are restricted due to the ratchet teeth of the locking pawl 58 meshing with the ratchet teeth of the ratchet hole 60. The webbing 38 is accordingly restricted from being pulled out from the spool 36, and the body of the occupant moving towards the vehicle front under inertia is effectively restrained by the webbing 38.

The take-up device main body 12 configuring the webbing take-up device 10 is installed in the seat back 20 of the seat 16 as described above. The seat 16 is provided with what is referred to as a "reclining mechanism" for tilting the seat back 20 about the shaft 22 with respect to the seat cushion 18. The take-up device main body 12 installed in the seat back 20 turns about the shaft 22 and tilts when the seat back 20 is tilted with respect to the seat cushion 18.

In the webbing take-up device 10, when the seat back 20 is tilted such that the upper end side of the seat back 20 goes down towards the rear of the seat 16, the case 212 that is fixed to the frame of the seat back 20 rotates, from the state illustrated in FIG. 2, in the direction of arrow C in FIG. 1 and FIG. 2. However, since the fixing tab 348 of the operation plate 342 of the reclining sensor 210 is fixed to the frame of the seat cushion 18, the operation plate 342 does not turn when the seat back 20 is tilted. The case 212 accordingly relatively rotates in this state with respect to the operation plate 342 in the direction of arrow C in FIG. 1 and FIG. 2.

Figure 3:
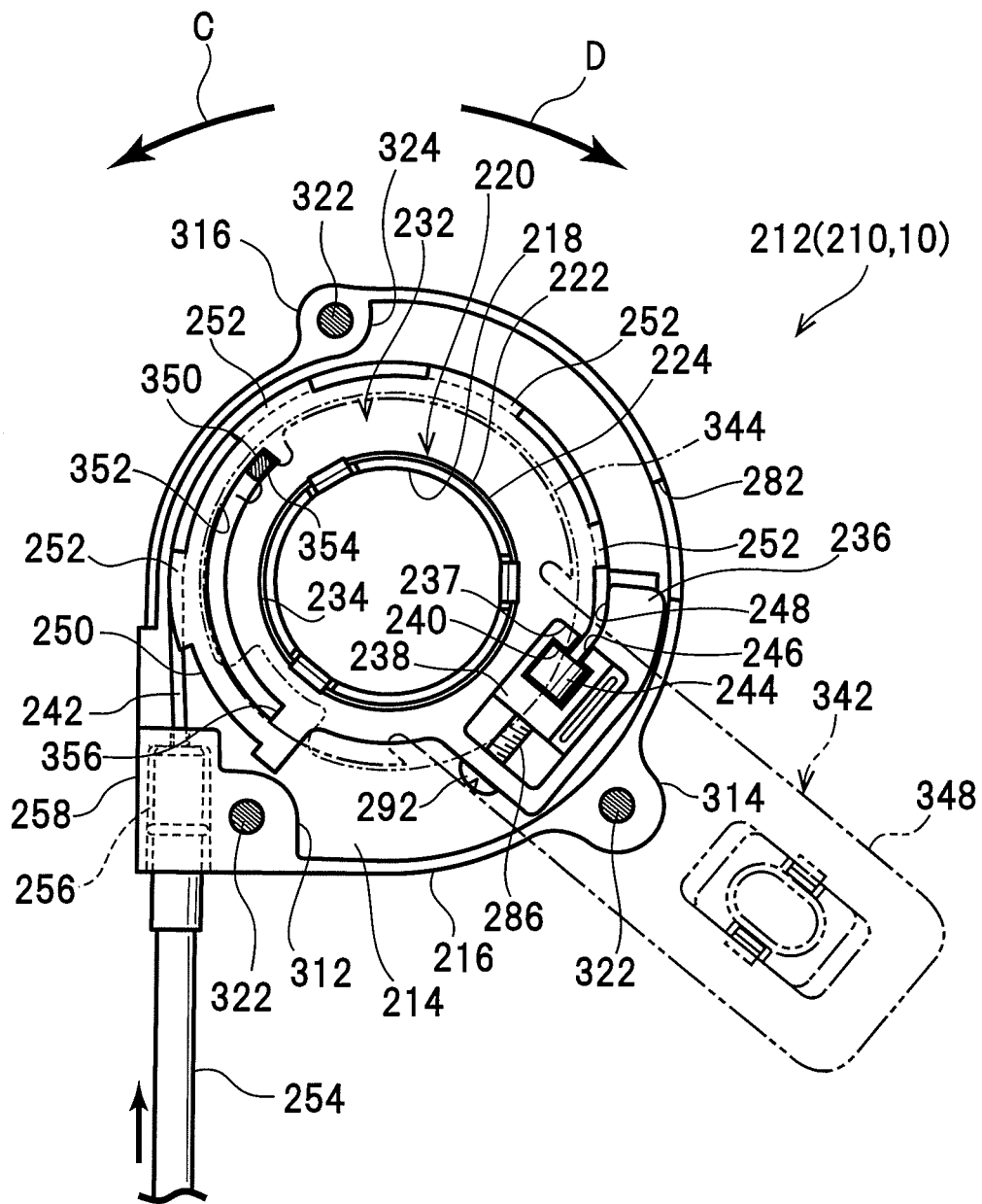
FIG. 3 is a face-on view of a tilt detection section in a state in which the seat back is tilted towards the rear.

When the pulley 232 attempts to turn together with the case 212 in this state, the pressing tab 350 of the operation plate 342 interferes with the end portion 354 of the slit hole 352, and rotation of the pulley 232 in the arrow C direction is restricted. The case 212 accordingly rotates in this state relative to the pulley 232 in the arrow C direction in FIG. 2. As shown in FIG. 3, when such relative rotation occurs, the adjuster piece housing portion 236 of the pulley 232 relatively moves away from the tube anchor portion 258 of the case 212 in the arrow D direction (namely in the opposite direction to the rotation direction of the case 212 with respect to the pulley 232).

The anchor fastening 256 provided to the length direction base end portion of the tube 254 is anchored to the tube anchor portion 258 of the case 212, and the anchor piece 244 provided to the length direction base end portion of the wire 242 is anchored to the adjuster piece housing portion 236 of the pulley 232 via the adjuster piece 238. Accordingly, when the adjuster piece housing portion 236 of the pulley 232 moves away from the tube anchor portion 258 of the case 212 in the arrow D direction in FIG. 1 and FIG. 2, the wire 242 inside the tube 254 moves towards the length direction base end side against the biasing force of the of the wire biasing section inside the sensor housing operation section 272.

Figure 8:
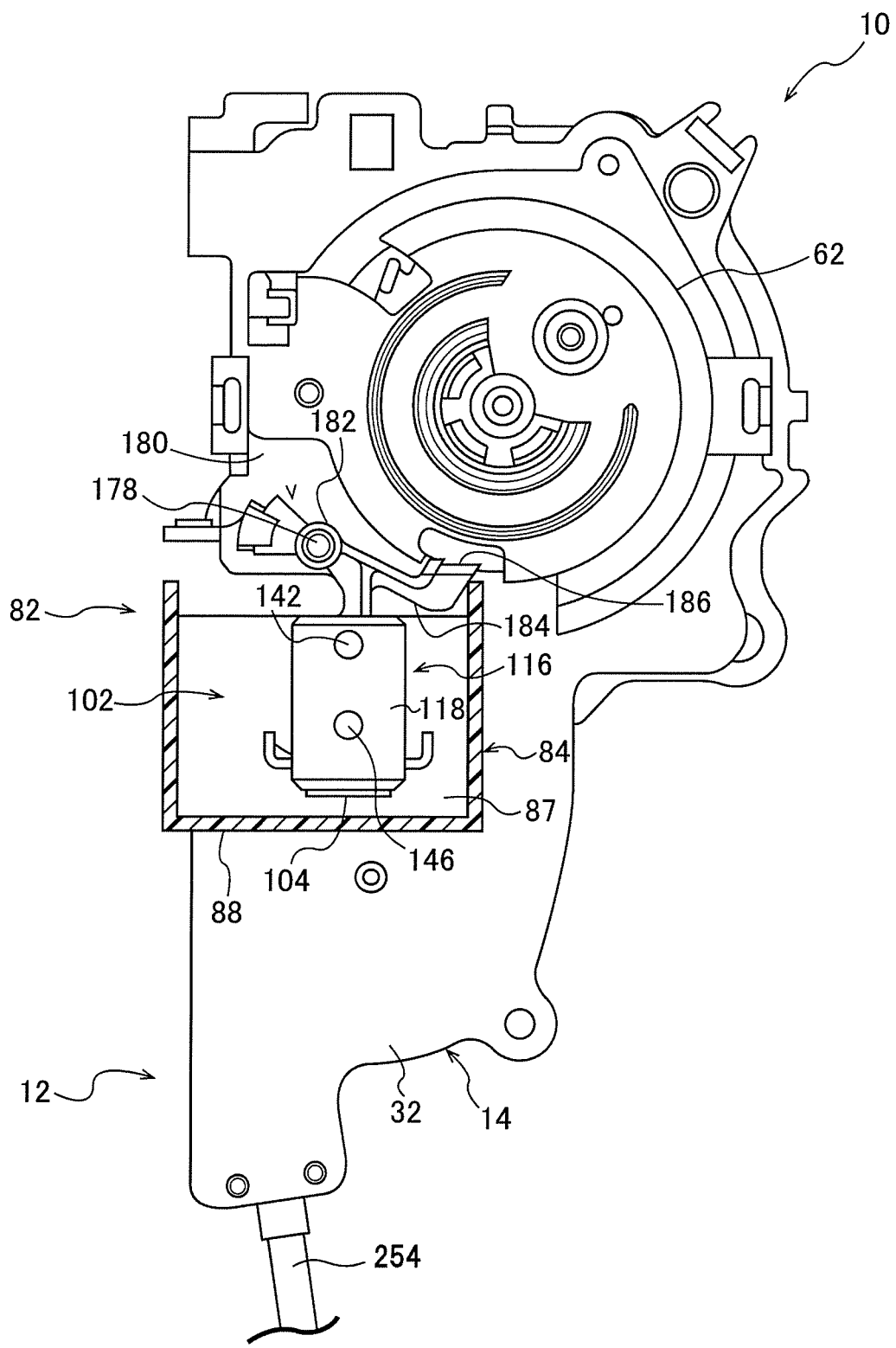
FIG. 8 is a side-on view schematically illustrating a configuration of a take-up device body of a webbing take-up device according to an exemplary embodiment of the present invention.
Figure 9:
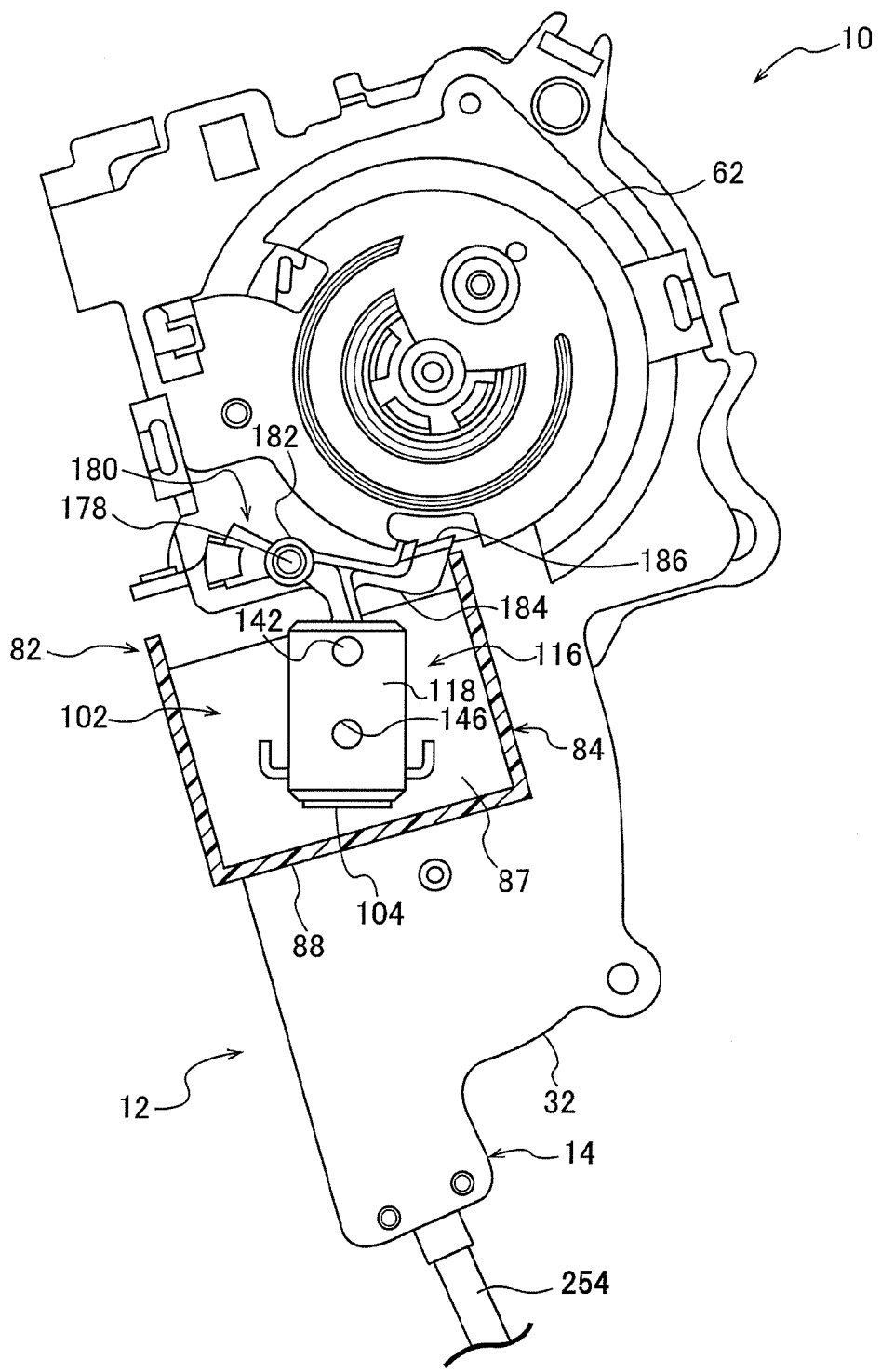
FIG. 9 is a side-on view illustrating a tilted state of a seat back and a take-up device body.

Inside the sensor housing operation section 272, the length direction leading end of the wire 242 accordingly moves towards the base end side, the rack that is anchored to the leading end of the wire 242 slides, and the pinion that is meshed with the rack is rotated. As shown in FIG. 9, the sensor housing 102 of the acceleration sensor 82 accordingly turns with respect to the frame 14, from the state illustrated in FIG. 8, so as to cancel tilting of the frame 14. The original attitude (orientation) (an attitude in which the upper face of the placement portion 104 faces vertically upwards) of the sensor housing 102 is accordingly maintained due to the rotation of the sensor housing 102 with respect to the frame 14. The spherical body 110 can accordingly be prevented from rolling around unintentionally (when the vehicle has not suddenly decelerated) even when the take-up device main body 12 is tilted together with the seat back 20.

In the reclining sensor 210 of the webbing take-up device 10, when the case 212 rotates with respect to the pulley 232 in the arrow C direction of FIG. 1 and FIG. 2 as described above (in other words, when relative rotation of the pulley 232 with respect to the case 212 in the arrow D direction occurs), the wire 242 pulled from the length direction base end portion of the tube 254 is wound onto the wind portion 250 of the pulley 232. Thus in the present exemplary embodiment, a section that pulls the wire 242 in the wire 242 length direction is configured to rotate about the large diameter cylinder portion 222 of the cylinder portion 220. It is accordingly sufficient for the space inside the case 212 to be such to enable the pulley 232 to be housed therein. A reduction in size can accordingly be achieved for the case 212, and consequently for the reclining sensor 210.

When the upper end side of the seat back 20 goes down towards the front of the seat 16 and the seat 16 is folded up, the case 212 rotates together with the seat back 20 in the arrow D direction in FIG. 2. When the case 212 rotates in this way, the adjuster piece housing portion 236 is pressed by the restriction portion 326 and the pulley 232 rotates together with the case 212 in the arrow D direction. When such rotation occurs in the case 212, there is no change in the separation between the adjuster piece housing portion 236 of the pulley 232 and the tube anchor portion 258 of the case 212, so the sensor housing 102 is not turned.

Figure 4:
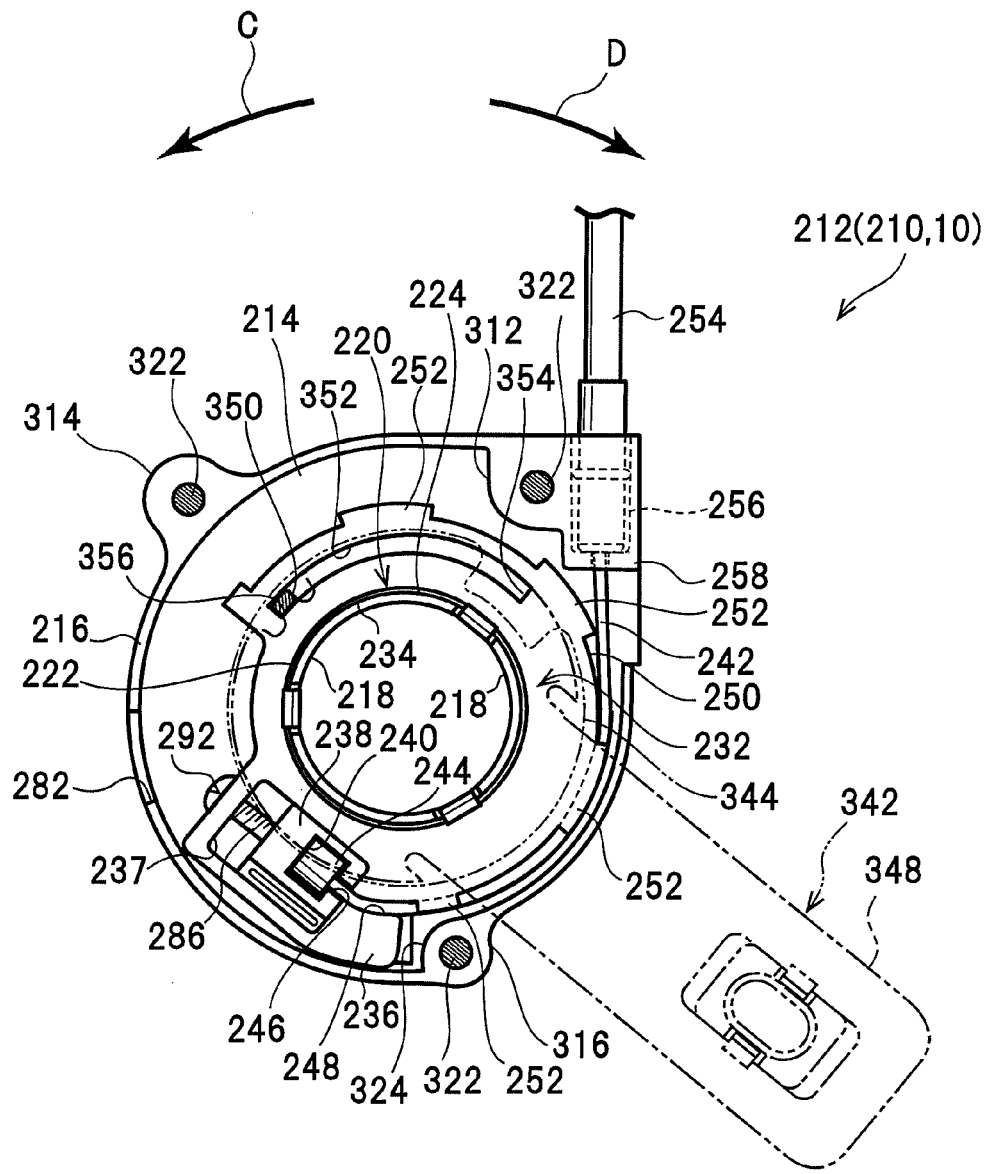
FIG. 4 is a face-on view of a tilt detection section in a state in which the seat back is tilted towards the front.

Moreover, when the pulley 232 rotates together with the case 212 in the arrow D direction in FIG. 2, as shown in FIG. 4, the pressing tab 350 of the operation plate 342 moves relatively to the slit hole 352 so as to move away from the end portion 354. Accordingly, there is no unintentional interference of the pulley 232 with the operation plate 342 fixed to the seat cushion 18 even when such rotation of the case 212 and the pulley 232 occurs, and the seat back 20 can be tilted smoothly towards the seat 16 front side.

As described above, in the present exemplary embodiment, the adjuster piece housing portion 236 of the pulley 232 moves towards or away from the restriction portion 326 of the case 212 due to the adjuster piece housing portion 236 of the pulley 232 moving towards or away from the tube anchor portion 258 of the case 212. The adjuster piece housing portion 236 and the restriction portion 326 impact each other due the adjuster piece housing portion 236 of the pulley 232 approaching the tube anchor portion 258 of the case 212. However the restriction portion 326 is a portion of the boss 316 through which the fastening member 322 passes, and so the restriction portion 326 (namely the boss 316) is accordingly effectively reinforced by the fastening member 322 against impact which the restriction portion 326 receives from the adjuster piece housing portion 236. Accordingly sufficient mechanical strength and rigidity can be obtained for the restriction portion 326 with respect to impact received from the adjuster piece housing portion 236 even without forming the restriction portion 326 with a particularly large size.

The lid 302 of the reclining sensor 210 is integrally attached to the case 212 by the fastening members 322 as described above. In the seat back initial state (the state illustrated in FIG. 2), the adjuster piece operation window 282 is positioned on the extension line in the length direction of the adjuster piece housing hole 237 of the adjuster piece housing portion 236. When an adjuster piece operation member such as a screwdriver is inserted from outside the case 212 and passes through the adjuster piece operation window 282 in this state, the adjuster piece operation member can be made to engage with the head portion 292 of the male thread 286.

The adjuster piece 238 moves in the length direction of the adjuster piece housing hole 237 when the male thread 286 is rotated by rotating the adjuster piece operation member about the axial center of the male thread 286 in an engaged state of the adjuster piece operation member and the head portion 292. The turning position of the sensor housing 102 in the seat back initial state can accordingly be adjusted by thus moving the adjuster piece 238 together with the anchor piece 244. Moreover, as described above, since the adjuster piece operation member can be inserted through the adjuster piece operation window 282 formed in the peripheral wall 216 of the case 212, there is no need to remove the lid 302 from the case 212.

The operational efficiency when adjusting the turn position of the sensor housing 102 in the seat back initial state can accordingly be enhanced.

In the reclining sensor 210 of the webbing take-up device 10, in the tube anchor portion 258 for anchoring the anchor fastening 256 (namely, the length direction base end of the tube 254), the opening groove portion 262 for disposing the anchor fastening 256 inside the tube anchor portion 258 is orthogonal to the length direction of the tube 254 which is inside the tube anchor portion 258, and is open towards the rotation radial direction outside of the pulley 232. The anchor fastening 256 accordingly cannot readily come out of the tube anchor portion 258 when the anchor piece 244 provided at the length direction base end of the wire 242 is anchored to the adjuster piece 238 and the anchor fastening 256 is disposed inside the tube anchor portion 258 through the opening groove portion 262 in a state in which the adjuster piece 238 is disposed inside the adjuster piece housing hole 237 of the adjuster piece housing portion 236. The anchor fastening 256, and therefore the tube 254, do not readily detach from the tube anchor portion 258 during for example an operation to fasten and fix the lid 302 to the case 212.

What is claimed is:

1. A webbing take-up device, comprising:
    a take-up device main body that is provided at a seat back that is capable of tilting, with respect to a seat cushion configuring a vehicle seat, about an axis having an axial direction in a seat width direction, the take-up device main body including:
        a spool that takes up a webbing by rotating in a take-up direction; and
        a locking mechanism that, by actuating, restricts rotation of the spool in a pull-out direction that is an opposite direction to the take-up direction;
    an acceleration sensor that includes a housing on which is placed an inertia mass body that actuates the locking mechanism by moving under inertia, the acceleration sensor being provided at the take-up device main body so as to be capable of turning with respect to the take-up device main body about a specific turning axis;
    an elongated coupling member whose leading end in a length direction is directly or indirectly connected to the housing of the acceleration sensor, and that turns the housing of the acceleration sensor with respect to the take-up device main body by displacing in the length direction;
    a tilt detection section spaced apart from the take-up device main body that includes a rotating body to which a base end side in the length direction of the coupling member is anchored and which rotates integrally with tilting of the seat back or rotates in conjunction with the tilting of the seat back, the rotating body winding up thereon the coupling member from the base end side in the length direction of the coupling member by rotating in one direction to pull and move the coupling member towards the base end side in the length direction of the coupling member to move the housing of the acceleration sensor; and
    a coupling member adjusting section to which a base end in the length direction of the coupling member is anchored and that is provided at the rotating body so as to be capable of adjustably moving relative to the rotating body in a line tangential to rotation of the rotating body in order to selectively adjust an operating length of the elongated coupling member between the take-up device main body and the tilt detection section.

2. The webbing take-up device of claim 1, further comprising:
    a tube whose leading end side is anchored to the take-up device main body and through the inside of which the coupling member passes; and
    a rotating body support member that rotatably supports the rotating body and to which a base end of the tube is anchored,
    wherein an operation section is provided at the rotating body support member at a side opposite to a side of an anchored position of the base end of the tube with respect to a center of rotation of the rotating body such that operation of the coupling member adjusting section is possible in a state in which the rotating body is positioned in a rotation position corresponding to the operation section.

3. The webbing take-up device of claim 2, wherein:
    the rotating body support member includes a support member main body;
    the support member main body is formed in a shape having a bottom and opening toward one side in a rotation axial direction of the rotating body, and rotatably supports the rotating body thereinside;
    a tube anchor portion is formed at the support member main body, the tube anchor portion opening at a portion of an outer periphery thereof along a length direction of the tube, and anchoring the base end of the tube disposed inside the tube anchor portion; and
    a tube mounting opening is formed at the tube anchor portion, the tube mounting opening opening in a direction orthogonal to the length direction of the tube and opening toward an outer side in a rotation radial direction of the rotating body.

4. The webbing take-up device of claim 3, wherein:
    a restriction portion is provided at the rotating body support member;
    the restriction portion faces the rotating body along a rotation direction of the rotating body, and restricts rotation of the rotating body by abutting the rotating body; and
    a fastening member for fixing of the rotating body support member passes through the restriction portion at a side opposite to a side of the rotating body with respect to an abutted position of the rotating body and the restriction portion.

5. The webbing take-up device of claim 2, wherein:
    a restriction portion is provided at the rotating body support member;
    the restriction portion faces the rotating body along a rotation direction of the rotating body, and restricts rotation of the rotating body by abutting the rotating body; and
    a fastening member for fixing of the rotating body support member passes through the restriction portion at a side opposite to a side of the rotating body with respect to an abutted position of the rotating body and the restriction portion.

6. The webbing take-up device of claim 5, wherein an accommodating section that accommodates the coupling member adjusting section is formed at an outer peripheral portion of the rotating body such that a length direction of an accommodation portion of the accommodating section corresponds to the line tangential to rotation of the rotating body.

7. The webbing take-up device of claim 6, wherein a peripheral wall is formed at the rotating body support member so as to rotatably support the rotating body thereinside, and the operation section is a window portion formed at the peripheral wail such that an operation member is insertable inside the rotating body support member through the window portion.

8. The webbing take-up device of claim 2, further comprising a rotation transmission member, wherein:
  the rotation transmission member is provided such that, in an engaged state with the rotating body in a rotation peripheral direction of the rotating body, the rotation transmission member is capable of coaxial relative rotation with respect to the rotating body;
  the rotation transmission member rotates integrally with tilting of the seat back or in conjunction with tilting of the seat back to transmit rotation to the rotating body to cause the rotating body to rotate; and
  the rotation transmission member is capable of relative rotation in the other direction with respect to the rotating body in a state in which rotation of the rotating body in the other direction is restricted.

9. The webbing take-up device of claim 2, wherein a peripheral wall is formed at the rotating body support member so as to rotatably support the rotating body thereinside, and the operation section is a window portion formed at the peripheral wall such that an operation member is insertable inside the rotating body support member through the window portion.

10. The webbing take-up device of claim 1, further comprising a rotation transmission member, wherein:
  the rotation transmission member is provided such that, in an engaged state with the rotating body in a rotation peripheral direction of the rotating body, the rotation transmission member is capable of coaxial relative rotation with respect to the rotating body;
  the rotation transmission member rotates integrally with tilting of the seat back or in conjunction with tilting of the seat back to transmit rotation to the rotating body to cause the rotating body to rotate; and
  the rotation transmission member is capable of relative rotation in the other direction with respect to the rotating body in a state in which rotation of the rotating body in the other direction is restricted.

11. The webbing take-up device of claim 1, wherein an accommodating section that accommodates the coupling member adjusting section is formed at an outer peripheral portion of the rotating body such that a length direction of an accommodation portion of the accommodating section corresponds to the line tangential to rotation of the rotating body.

12. The webbing take-up device of claim 11, wherein a restriction portion, that is provided at a support member main body rotatably supporting the rotating body thereinside, faces the accommodating section of the rotating body along the rotation direction of the rotating body, and restricts rotation of the rotating body by abutting the accommodating section.

13. The webbing take-up device of claim 1, wherein the coupling member adjusting section includes an adjustment screw member connected to the. base end of the coupling member.

\* \* \* \* \*